United States Patent
Lee et al.

(10) Patent No.: US 8,768,092 B2
(45) Date of Patent: *Jul. 1, 2014

(54) METHOD FOR MINIMIZING SCINTILLATION IN DYNAMIC IMAGES

(71) Applicant: DRS RSTA, Inc., Dallas, TX (US)

(72) Inventors: Harry C. Lee, Dallas, TX (US); Teresa L. Pace, Dallas, TX (US); Marlon J. Fuentes, Dallas, TX (US)

(73) Assignee: DRS RSTA, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,173

(22) Filed: Aug. 23, 2013

(65) Prior Publication Data

US 2013/0343671 A1    Dec. 26, 2013

Related U.S. Application Data

(63) Continuation of application No. 13/286,395, filed on Nov. 1, 2011, now Pat. No. 8,526,676, which is a continuation of application No. 12/130,294, filed on May 30, 2008, now Pat. No. 8,073,199.

(51) Int. Cl.
G06K 9/40    (2006.01)

(52) U.S. Cl.
USPC .......................................................... 382/274

(58) Field of Classification Search
USPC .................................................. 382/274–275
See application file for complete search history.

(56) References Cited

U.S. PATENT DOCUMENTS

| | | |
|---|---|---|
| 5,448,053 A | 9/1995 | Rhoads |
| 6,556,708 B1 | 4/2003 | Christian et al. |
| 7,068,837 B2 | 6/2006 | Befu et al. |
| 7,139,421 B1 | 11/2006 | Fix et al. |
| 7,269,299 B2 * | 9/2007 | Schroeder ..................... 382/294 |

(Continued)

OTHER PUBLICATIONS

International Search Report and Written Opinion of the International Searching Authority mailed Jul. 16, 2009 for Int'l Patent Application No. PCT/US2009/045565, 7 pages.

(Continued)

*Primary Examiner* — Jingge Wu
(74) *Attorney, Agent, or Firm* — Kilpatrick Townsend & Stockton LLP

(57) ABSTRACT

A method for reducing scintillation in an image of a scene includes receiving an input sequence of images of the scene and grouping a first plurality of images of the sequence of images into a first subset of images comprising a first number of images that occur in sequence within the input sequence of images of the scene. The method also includes grouping a second plurality of images of the sequence of images into a second subset of images comprising a second number of images that occur in sequence within the input sequence of images of the scene. The method further includes generating a set of averaged images comprising an averaged image for the first subset of images and an averaged image for the second subset of image and outputting a composite image based at least the set of averaged images.

23 Claims, 12 Drawing Sheets

(56) References Cited

U.S. PATENT DOCUMENTS

| | | |
|---|---|---|
| 7,545,967 B1 | 6/2009 | Prince et al. |
| 7,650,022 B2 * | 1/2010 | Kreang-Arekul et al. .... 382/128 |
| 7,941,000 B2 * | 5/2011 | Rongen et al. ................ 382/294 |
| 7,969,475 B2 * | 6/2011 | Zandifar et al. ........... 348/222.1 |
| 7,986,356 B2 * | 7/2011 | Chang et al. ................. 348/254 |
| 8,073,199 B2 * | 12/2011 | Lee et al. ..................... 382/103 |
| 8,203,764 B2 * | 6/2012 | King et al. ................... 358/450 |
| 8,526,676 B1 * | 9/2013 | Lee et al. ..................... 382/103 |
| 2005/0074140 A1 | 4/2005 | Grasso et al. |
| 2005/0089194 A1 | 4/2005 | Bell |
| 2008/0279476 A1 * | 11/2008 | Rongen et al. ................ 382/284 |
| 2009/0185236 A1 * | 7/2009 | Zeng ............................. 358/450 |
| 2009/0245606 A1 | 10/2009 | Prince et al. |

OTHER PUBLICATIONS

Notice of Allowance mailed Jul. 28, 2011 for U.S. Appl. No. 12/130,294, 10 pages.

* cited by examiner

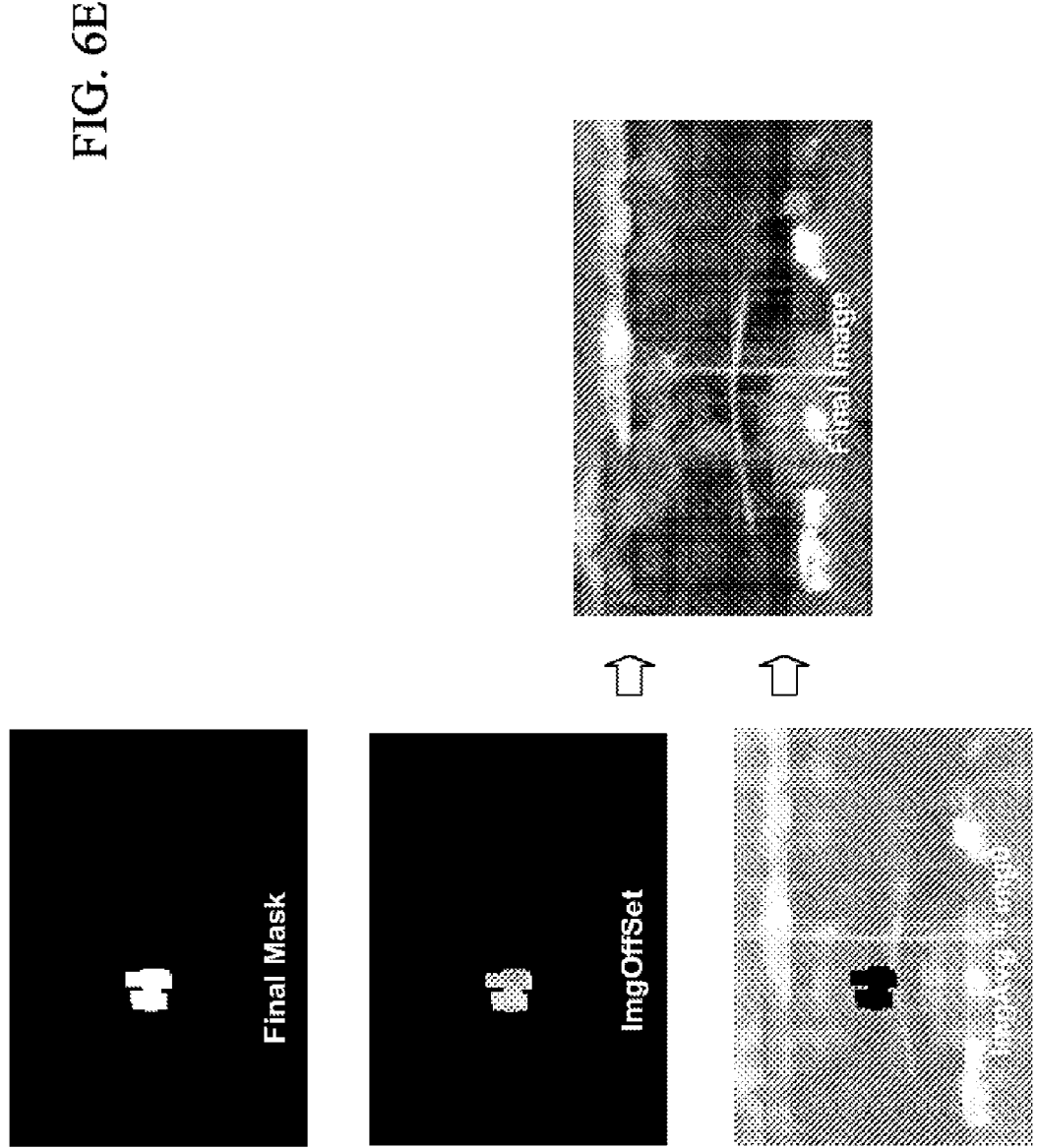

METHOD FOR MINIMIZING SCINTILLATION IN DYNAMIC IMAGES

CROSS-REFERENCES TO RELATED APPLICATIONS

This application is a continuation of U.S. patent application Ser. No. 13/286,395, filed on Nov. 1, 2011, which is a continuation of U.S. patent application Ser. No. 12/130,294, filed on May 30, 2008, now U.S. Pat. No. 8,073,199, the disclosures of which are hereby incorporated by reference in their entirety for all purposes.

FIELD OF THE INVENTION

The present invention relates, generally, to image processing and, more particularly, to a method for minimizing scintillation in dynamic images.

BACKGROUND OF THE INVENTION

Optical scintillation is typically caused by atmospheric turbulence or other atmospheric non-homogeneities, such as snow, rain, smoke, fog, underwater fluctuations or rising of pavement heat, which distorts an optical flow of a scene or an object being photographed. This optical distortion causes degradation in the quality of images taken by optical systems, used to form and/or record images.

In addition to atmospheric turbulences, when optical systems obtain images based on image data that have passed through a turbulent medium, the obtained images can also be distorted by the components of the optical systems. For example, the image of an object viewed with a telescope or other long-range imaging system may be distorted by mechanical, thermal, and optical limitations of the instrument.

Several approaches or methods have been used to mitigate or eliminate the effects of image distortion due to atmospheric turbulence. One approach relied on obtaining corrective information within the wavelength regime(s) in which imaging data is desired. For example, visible image data are used to correct visible images, and infrared image data are used to correct infrared images. However, this technique may be prohibitively expensive and impractical due to the additional complexity imposed on the optical systems.

Another approach, used in the area of astronomy, involve adaptive optics to correct each frame by sensing the wavefront distortion induced by the turbulence and providing a servo-controlled phase screen, often referred to as a rubber-mirror. However, imaging systems using adaptive optics to correct for atmospheric turbulence are complex and expensive.

Therefore, there is a need to remedy the problems noted above and others previously experienced for minimizing scintillation in dynamic images while retaining temporal object motion.

SUMMARY OF THE INVENTION

The foregoing problems are solved and a technical advance is achieved by methods, systems and articles of manufacture consistent with the present invention, which provide scintillation removal or minimization in an image of a scene or object.

In accordance with methods consistent with the present invention, a method for minimizing scintillation in an image of a scene or object is provided. The method comprises collecting a plurality of images, dividing the plurality of images into subsets of images, averaging each of the subsets of images to produce corresponding averaged images, differencing the averaged images, masking the difference images, and combining the masked images to produce a composite image.

In accordance with systems consistent with the present invention, an image processing system is provided. The system comprises a memory and a processing unit coupled to the memory wherein the processing unit is configured to execute the above noted method steps.

In accordance with articles of manufacture consistent with the present invention, there is provided a computer-readable medium containing a program adapted to cause a data processing system to execute the above-noted method steps. In this regard, the computer-readable medium may be a computer-readable medium, such as solid-state memory, magnetic memory such as a magnetic disk, optical memory such as an optical disk, or a computer-readable transmission medium, such as a modulated wave (such as radio frequency, audio frequency or optical frequency modulated waves) or a modulated downloadable bit stream that can be received by a computer via a network or a via a wireless connection.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIGS. 6A-6E illustrate an exemplary sequence of averaged, differenced and masked sets of images produced during the process of minimizing scintillation and restoring moving objects in the final composite image in accordance with the present invention.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts. As would be understood to one of ordinary skill in the art, certain components or elements for enhancing interpretability of laser illuminated images are not shown in the figures or specifically noted herein to avoid obscuring the invention.

Figure 1:
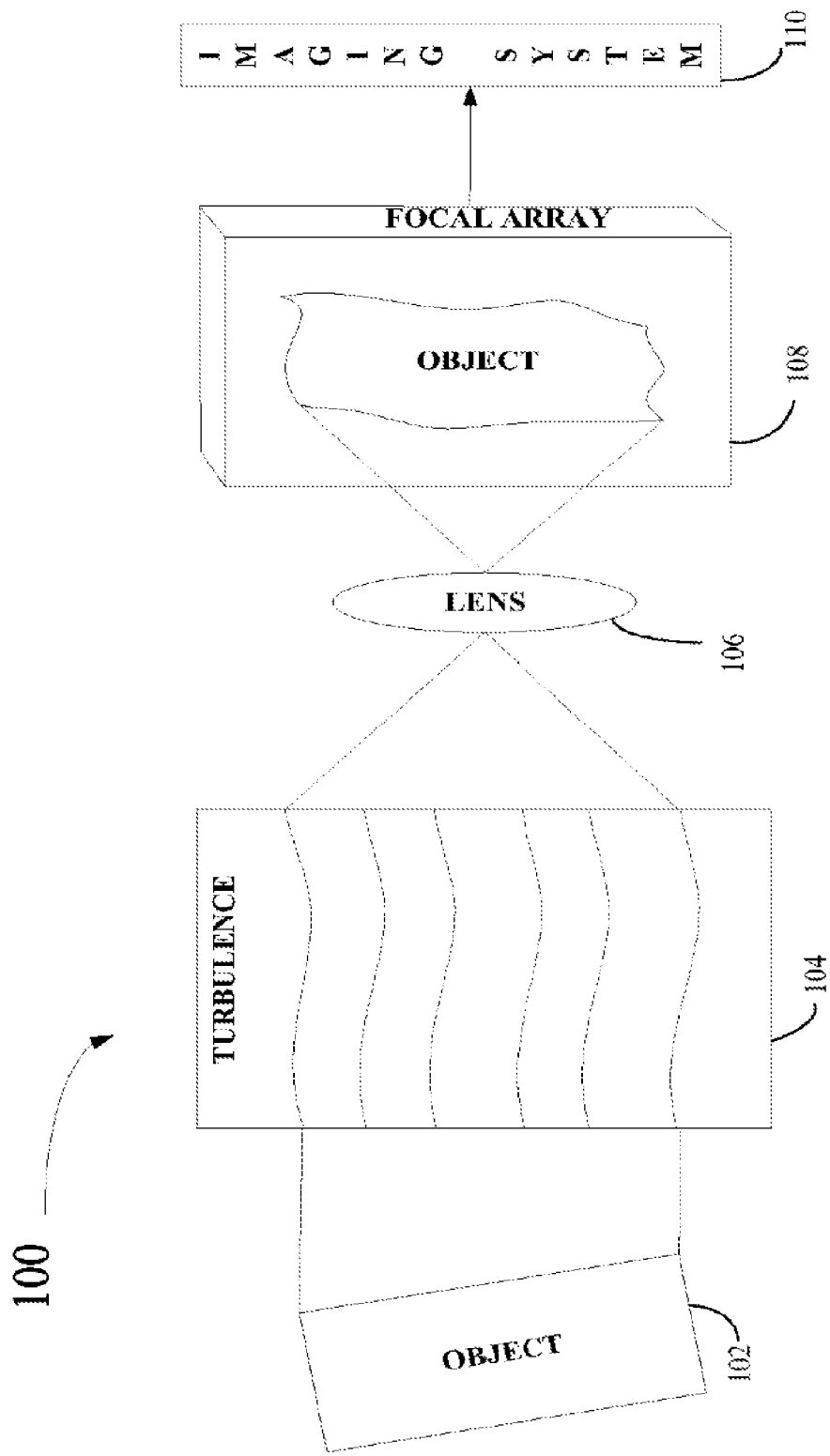
FIG. 1 is a schematic diagram illustrating an optical flow of an object traversing an atmospheric turbulence and captured by an optical system in accordance with the present invention.

Referring to FIG. 1 is a schematic diagram 100 illustrating an optical flow of an object 102 traversing an atmospheric turbulence 104 and captured by a focal array 108 via a lens 106 in accordance with the present invention.

The focal array 108 receives light representing the object 102, and captures image data signals representing the degraded image of the object 102. The light received can be distorted by atmospheric conditions (or turbulence) 104, such as rain, snow, fog, smoke, or underwater fluctuations, such that the images captured by focal array 108 are degraded or blurred. The focal array 108 is coupled to an image processing system 110 configured to process the captured dynamic images.

Figure 2A:
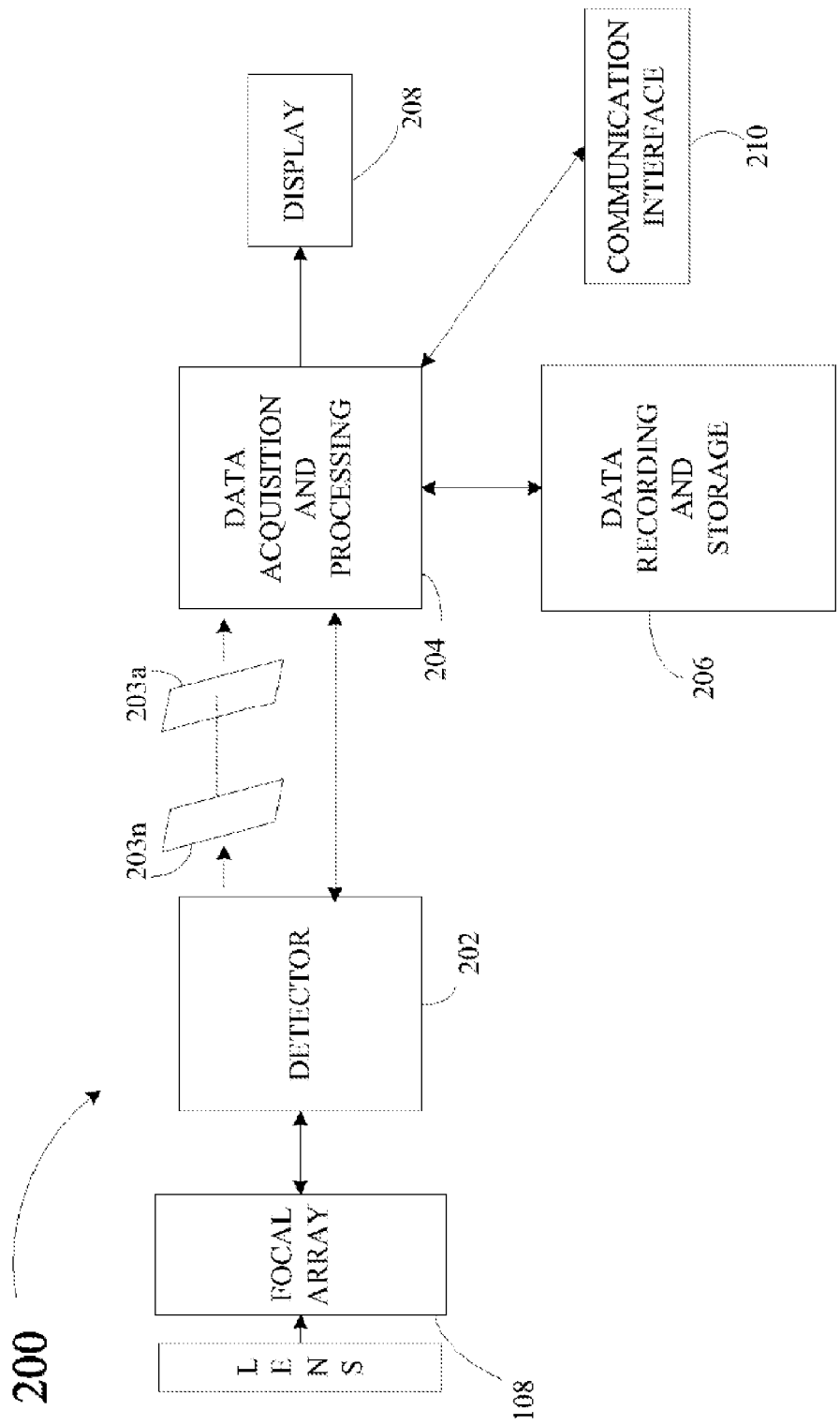
FIG. 2A is a block diagram illustrating one embodiment of an imaging system for removing scintillation from captured dynamic images in accordance with the present invention.

Now referring to FIG. 2A, an embodiment of the image processing or imaging system 110 is illustrated in accordance with the present invention. The imaging system 110 includes an image sensing or detection unit 202, an image acquisition and processing unit 204, a data recording and storage unit 206, a display unit 208, and a communication interface unit 210. Alternately, one or more of these devices, such as the display unit 208, may be incorporated into the image acquisition and processing unit 104, hereafter referred to as the processing unit 204.

The detection unit 202, hereafter referred to as the detector, comprises a focal plane array of pixels or photodetectors suitable for detecting an input image (e.g. 203a), such as an image degraded by atmospheric turbulence, during an integration and acquisition period, which may be triggered by the image acquisition and processing unit 204. The integration and acquisition period is described in more detail below. In the implementation shown, the detector 202 detects and outputs a sequence of input images 203a-203n, as directed by the image acquisition and processing unit 204.

The detector 202 may include the lens 106 that focuses light emitted or reflected from the object or scene 102 onto the focal plane array 108 of pixels 212aa-212nn. During each integration acquisition period or frame, each of the pixels 212aa-212nn accumulates a respective portion of the light from the object or scene and generates a corresponding signal or charge based on the intensity of the light. The electrical signals or charges generated by the pixels 212aa-212nn collectively represent an input image 203a which is output by the detector 202 to the processor 204. For purposes of illustration and clarity in the discussion, each input image 203a is assumed to correspond to, but not limited to, 256 by 256 pixels, referenced as 212aa-212nn in FIG. 1.

Figure 2B:
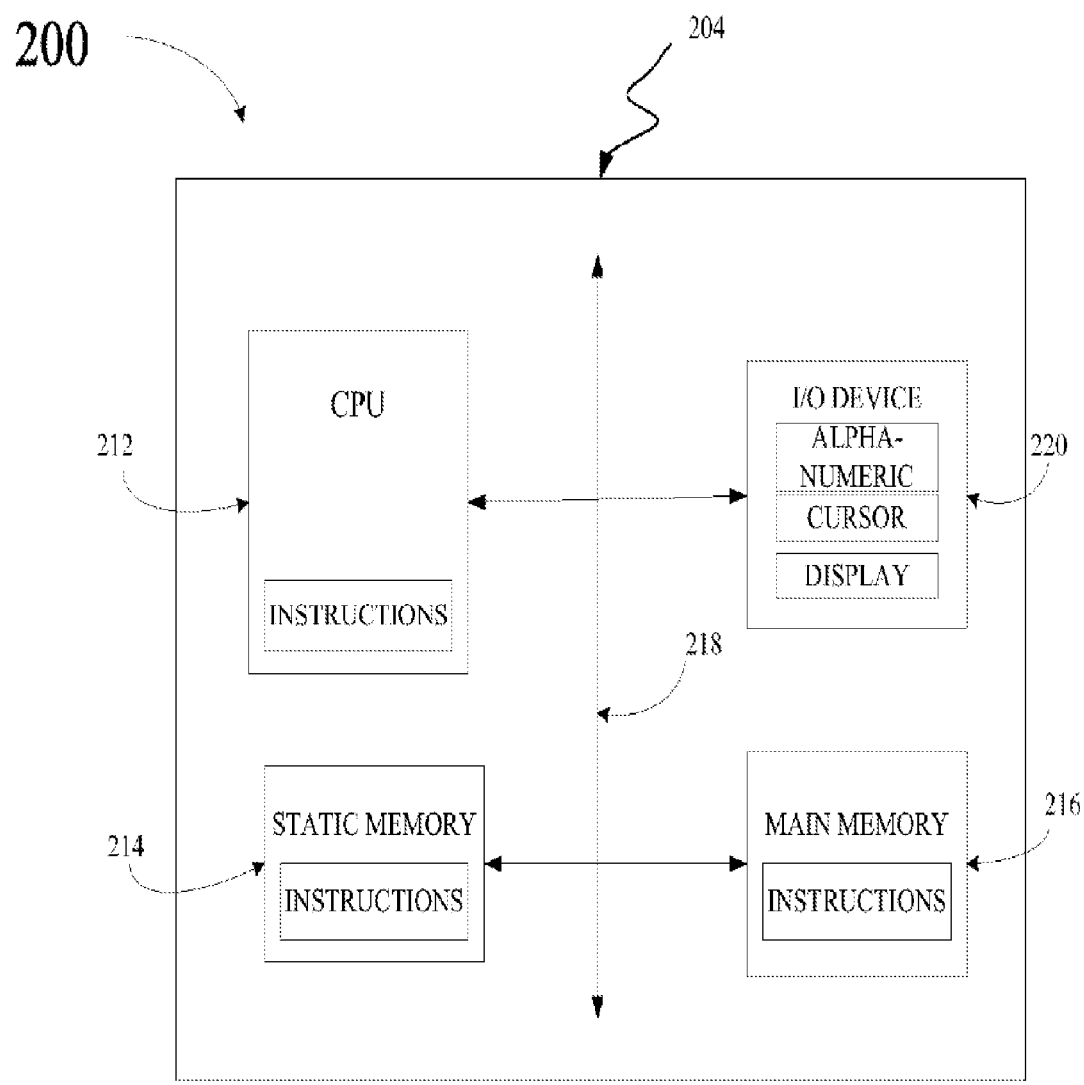
FIG. 2B is a block diagram illustrating the data acquisition and processing unit of FIG. 2A.

The data acquisition and processing unit 204, hereafter referred to as the processor, can be hard-wired circuits or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). As illustrated in FIG. 2B, the processor 204 can include a central processing unit (CPU) 212, a static memory 214 and a main memory 216 that can communicate with each other via bus 218. Additionally, the processor 204 may include an input/output device 220 that may have an alphanumeric device, such as a keyboard, a cursor control device, such as a mouse, and a video display device, such as a liquid crystal display (LCD), an organic light emitting diode (OLED), a flat panel display, a solid state display, or a cathode ray tube (CRT).

The data recording and storage unit 206 hereafter referred to as the memory, can comprise any type of memory including random access memory (RAM), electronically erasable memory (EPROM), and the like. Further, the memory 206 can comprise any type of storage including magnetic or optical drives, a local drive or a network drive, and a floppy disk, hard drive, CD-ROM, DVD-ROM, DVD-RAM, a tape drive, and the like. The communication interface 110 can comprise any type of interface for connecting to a communication network, such as a data or voice network, a land-line or wireless network, and the like. It will be recognized that one of ordinary skill in the art would understand how to build a communication interface, and hence, further description of this interface is omitted.

Figure 3:
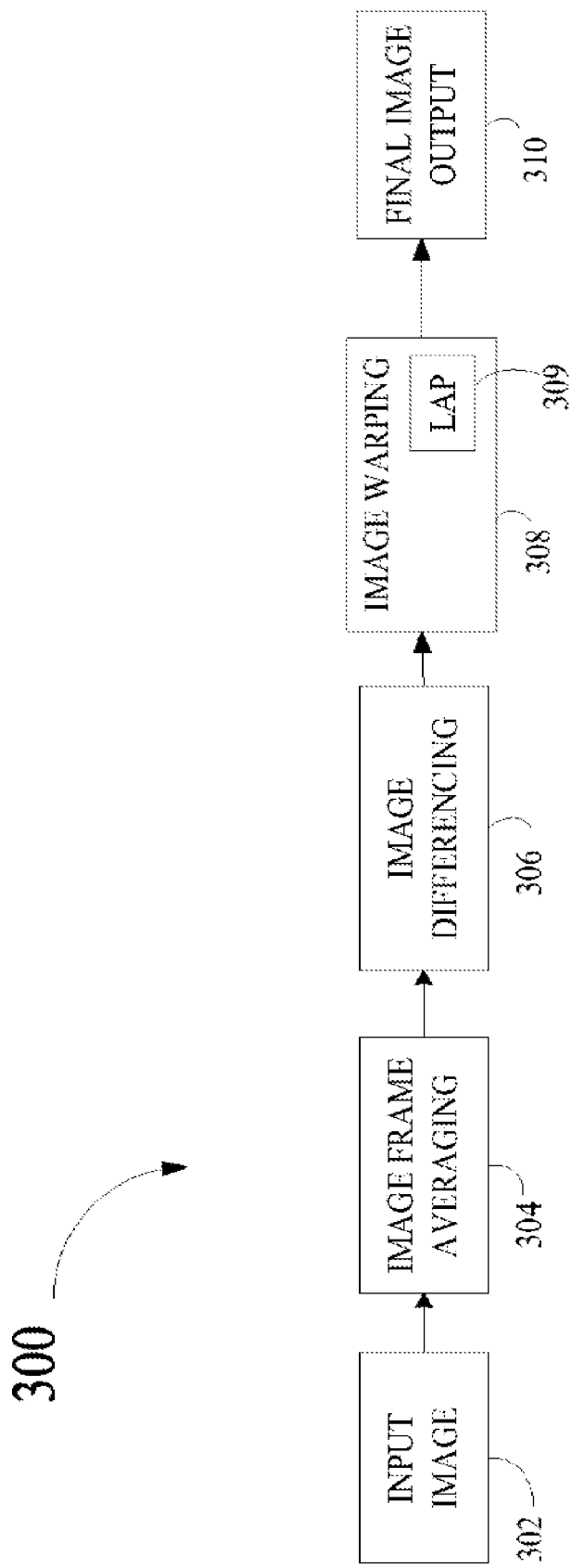
FIG. 3 is a block diagram illustrating a process for removing scintillation from dynamic images performed by the imaging system of FIG. 2 in accordance with the present invention.

Now referring to FIG. 3, a block diagram illustrating an exemplary process 300 for removing scintillation from dynamic images performed by the imaging system 110 of FIG. 2A is shown. The process 300 is represented by a plurality of functional processing units or steps, provided in an exemplary identified order, which are executed by the processor 204. The illustrative processing units include an input unit 302, an image frame averaging unit 304, an image differencing unit 306, an image warping unit 308, and an enhanced image output unit 310. The image warping unit 308 may include a local area processing unit (LAP) 309. The order of these processing units may of course be varied to the extent an output of one processing unit may not be required as an input of another processing unit. The processing units can be linked or coupled sequentially as shown, or alternatively a subset of these processing units can be run in parallel with another subset. A reduced or streamlined process might adopt fewer processing units, without impacting the intended functionality consistent with the present invention. It should be understood that various aspects of the present application may be used together as would occur to one of ordinary skill in the art without utilizing all of the processing units thereof. In addition, different combinations of these processing units might affect operational speed of the corresponding resulting processes and other intermediary processing outcomes. Accordingly, it should be apparent that other permutations of these processing units can be developed without departing from the spirit and scope of the present invention.

Initially, a set of instructions corresponding to this sequence of processing units is launched on the processor 204. This launching may be performed automatically with activation of the detector 202. The image frames 203a-203n may enter the imaging system 110 at the input unit 302 at real-time rates, nominally at about 30 frames, or a previously recorded suitable video frame sequence is loaded from the memory 216. The image frames 203a-203n form an individual temporal frame sequence, denoted as frame sequence set 1 in FIG. 5, which is updated in a "first in first out" (FIFO) manner so as to include the most recent image frame, thereby becoming the most updated sequence with each newly acquired or uploaded image frame. As the name indicates, the FIFO sequence set 1 is an image buffer queue that is configured to include a predetermined number of input image frames. That is, when this predetermined number is reached, the oldest image frame is discarded and the newest image frame is added, thereby maintaining the same predetermined number of newest image frames.

In order to greatly reduce or remove scintillation effects, typically sequential frames are averaged. As known to one of ordinary skill in the art, when frame averaging is used, the image is improved. Three types of frame averaging are typically used: integration averaging, averaging, and recursive averaging. Integration averaging applies to a still image. Recursive averaging has the advantage that it can be performed on the fly.

Figure 4:
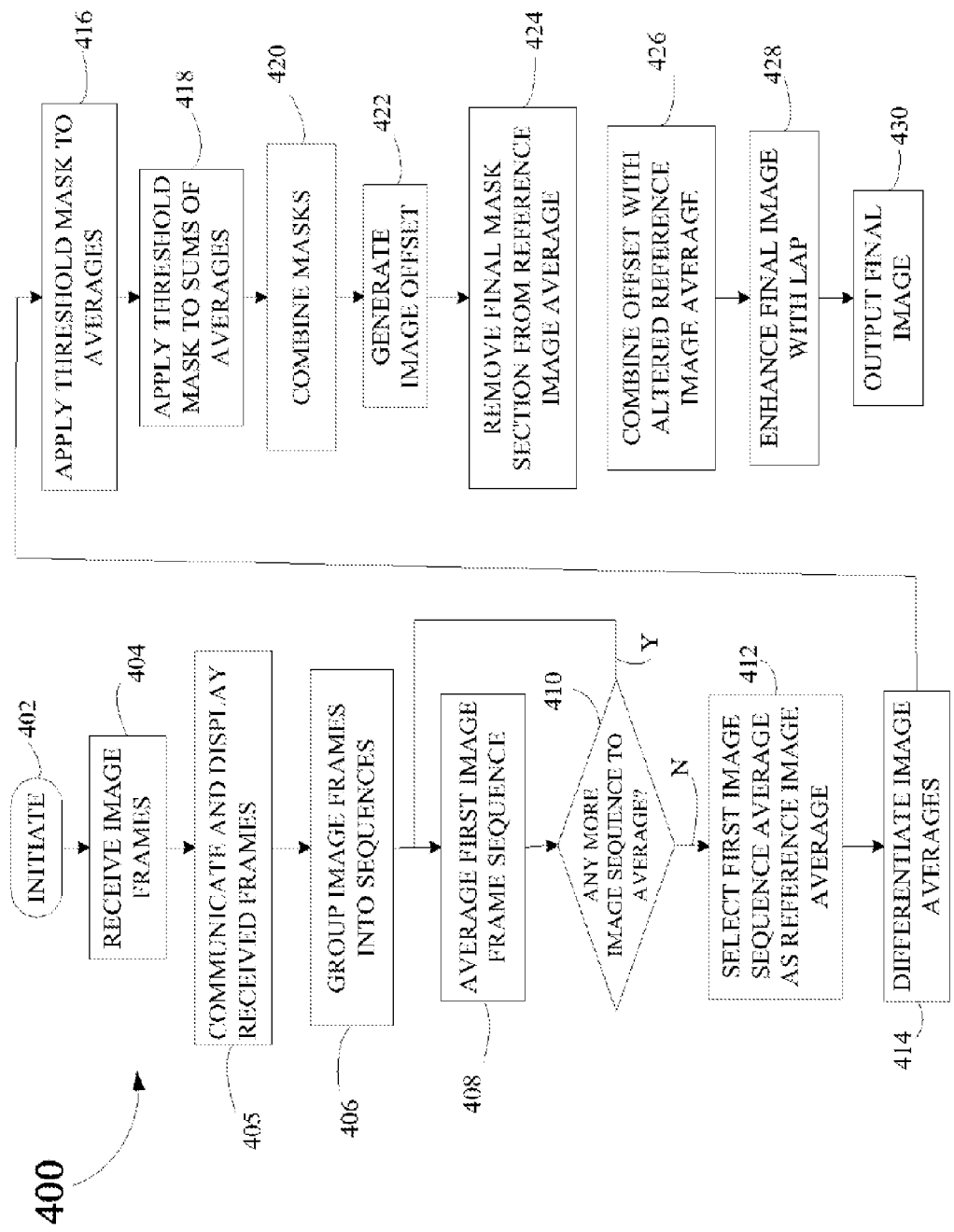
FIG. 4 is a flow diagram of the process for removing scintillation from dynamic images performed by the imaging system of FIG. 2 in accordance with the present invention.

Now referring to FIG. 4, a flow diagram 400 illustrating the process for removing scintillation from dynamic images performed by the imaging system of FIG. 2 is shown. The scintillation removal process 300 is initiated at step 402. The frame sequence set 1, which may represent a scintillation video (SV), comprises n successive frames 103a-103n received from the image input unit 302, at step 404. The first image frame 103a heads the sequence of image frames 103a-103n, which may be captured by the detector 102 at real time rates, nominally about 30 frames per second (fps). Alternately, as stated above the sequence of image frames 103a-103n may be retrieved from the main memory 216 of the processor 204 or from the memory 206 as a previously stored sequence of image frames. At step 405, the received first image frame 103a may be communicated to and displayed by the display unit 208 if the user desires and can be stored unprocessed, if newly acquired, in the memory 206. Steps 404 and 405 correspond to the input unit 302 in FIG. 3.

Figure 5:
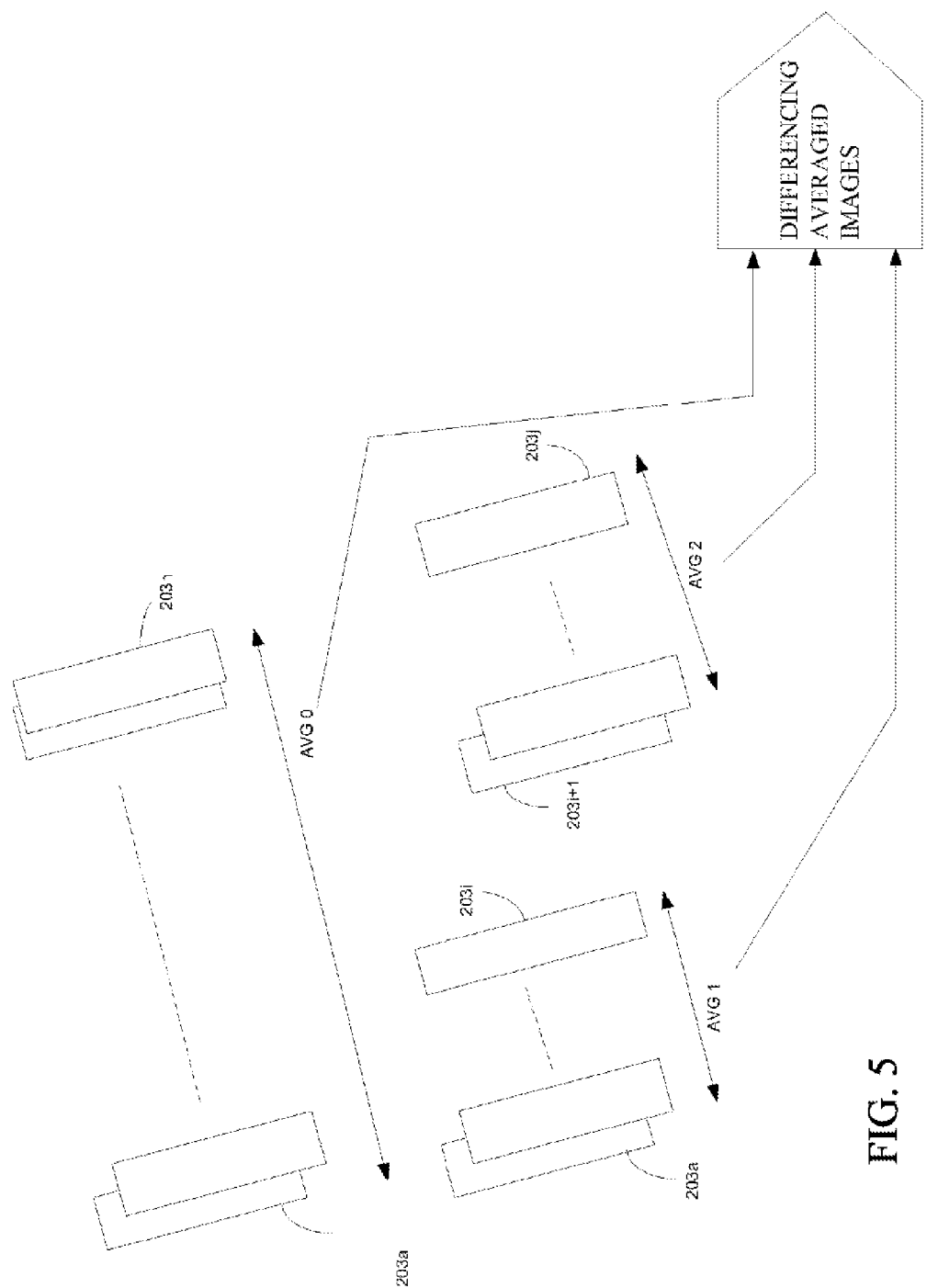
FIG. 5 is a schematic diagram illustrating the averaging of image sequences and the differencing of the resulting averaged image sequences in accordance with the present invention.

At step 406, the frame sequence set 1 is subdivided into a plurality of subsets of frames, which may be contiguous and/or overlapping. Preferably, these subsets of frames do not have the same of frames, so as to produce running scene averages of various durations. Each of the plurality of subsets of frames is then averaged to form a series of average image sequences, at step 408. For example, the frame sequence set 1 is averaged to form a first average image sequence, denoted AIS0 or Avg0, as shown in FIG. 5. A second average image sequence Avg1 may be formed by averaging image frames 103a to 103i, and a third average image sequence Avg2 may be formed by averaging image frames 103i+1 to 103j, where j≤n. The frame averaging of these subsets of frames, which is performed by the frame averaging unit 304, is used to achieve a stabilized background image by minimizing or even removing scintillation distortions from the images.

At step 410, a check is performed as to whether an additional subset of frames is queued for processing. In the affirmative, this additional subset of frames is averaged to produce Avg3 (not shown). Otherwise, at step 412 the first average image sequence Avg0 is selected as a reference averaged sequence.

At step 414, each of the Avg1 and Avg2 sequences are differenced from the reference averaged sequence Avg0 by the image differencing unit 306. In each AIS or Avg, the scintillation is substantially minimized or even removed but moving objects remain as motion blurs. As such, this differencing or comparison of the averaged image sequences enables the determination of the location of the moving objects in the images.

Figure 6A:
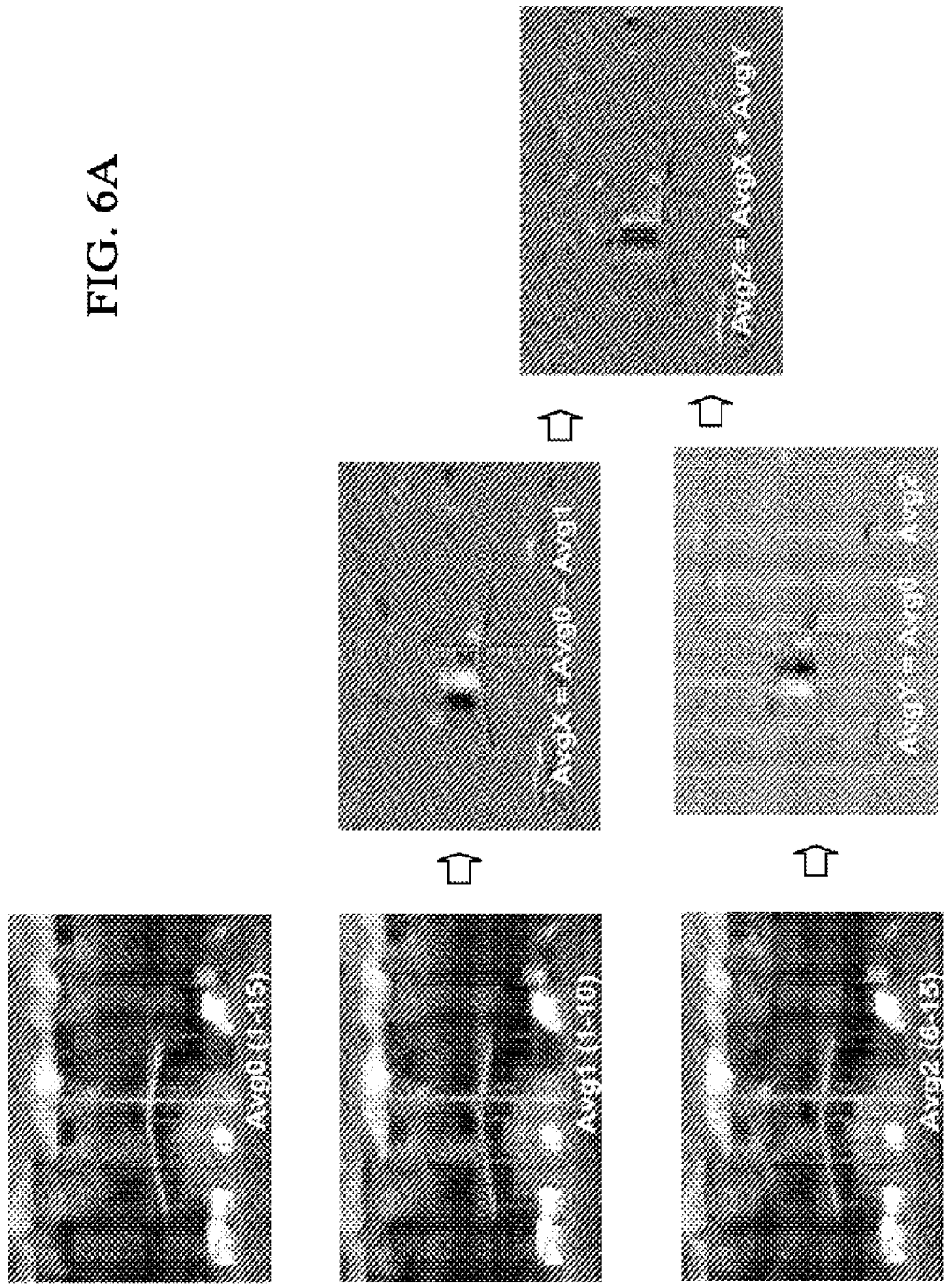

As shown in FIG. 6A, the averaged image sequence Avg1 is subtracted from the reference averaged sequence Avg0 to produce an image difference, denoted as AvgX. Similarly, the averaged image sequence Avg2 is subtracted from the reference averaged sequence Avg0 to produce an image difference, denoted as AvgY. These resulting image differences AvgX and AvgY are then added together to produce image difference AvgZ. This subtracting and subsequent adding of image differences result in the determination of a mask region in the image difference AvgZ from where the moving objects need to be extracted.

Figure 6B:
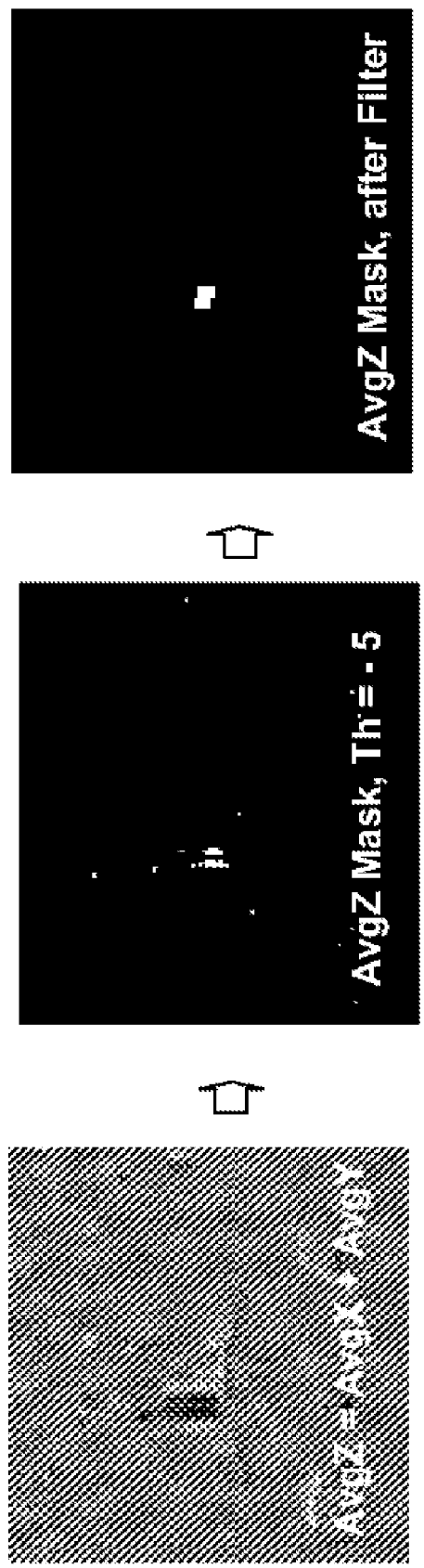

At step 416, a process of building masks for isolating and extracting the moving objects is commenced. The image difference AvgZ is threshold to form a masked image, denoted hereafter as AvgZ Mask, by selecting an appropriate threshold value that improves the determination of where the moving objects are located. Subsequently, the AvgZMask image is filtered or cleaned by a series of isotropic operators, for example an image erosion operator followed by an image dilation operator, as shown in FIG. 6B.

Figure 6C:
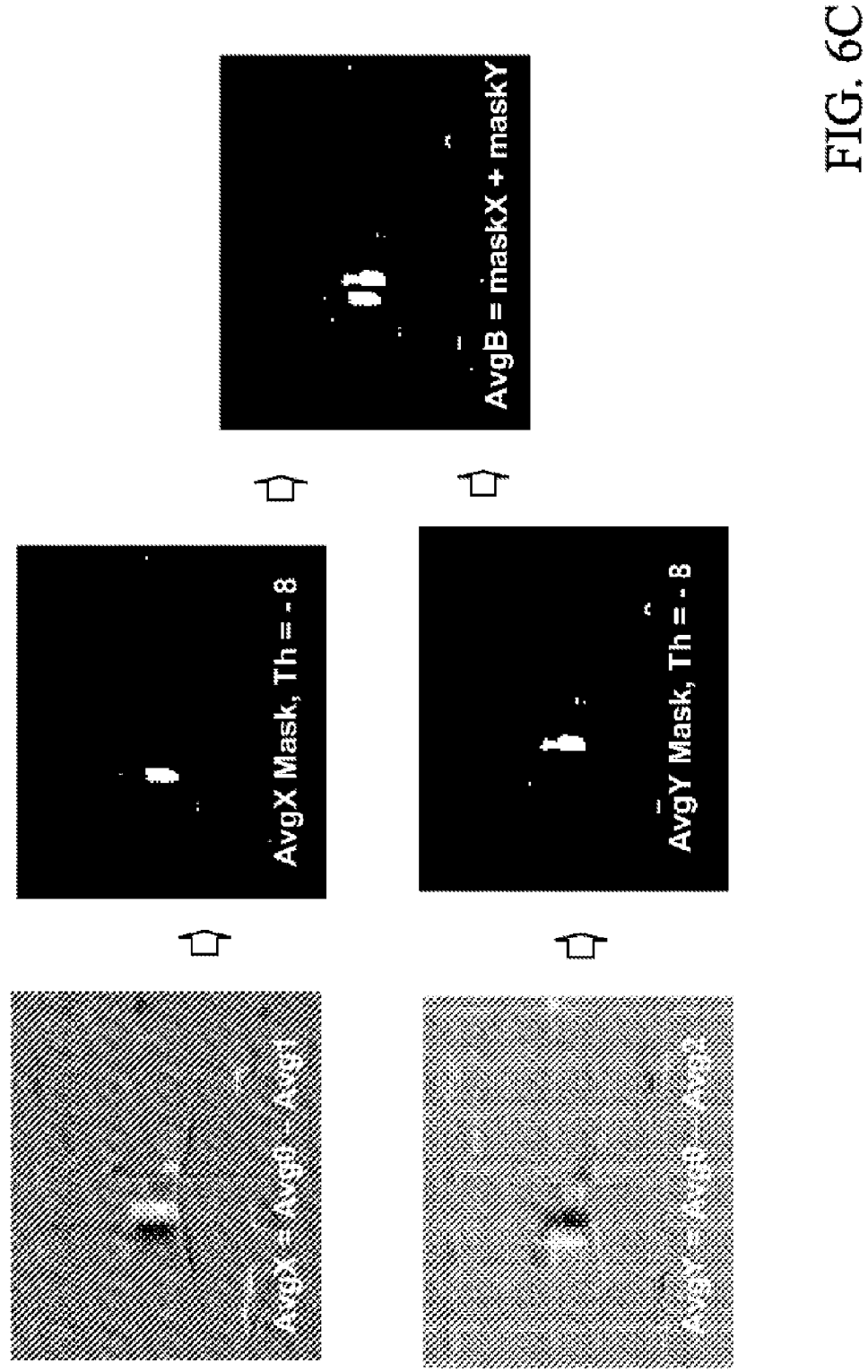
Figure 6D:
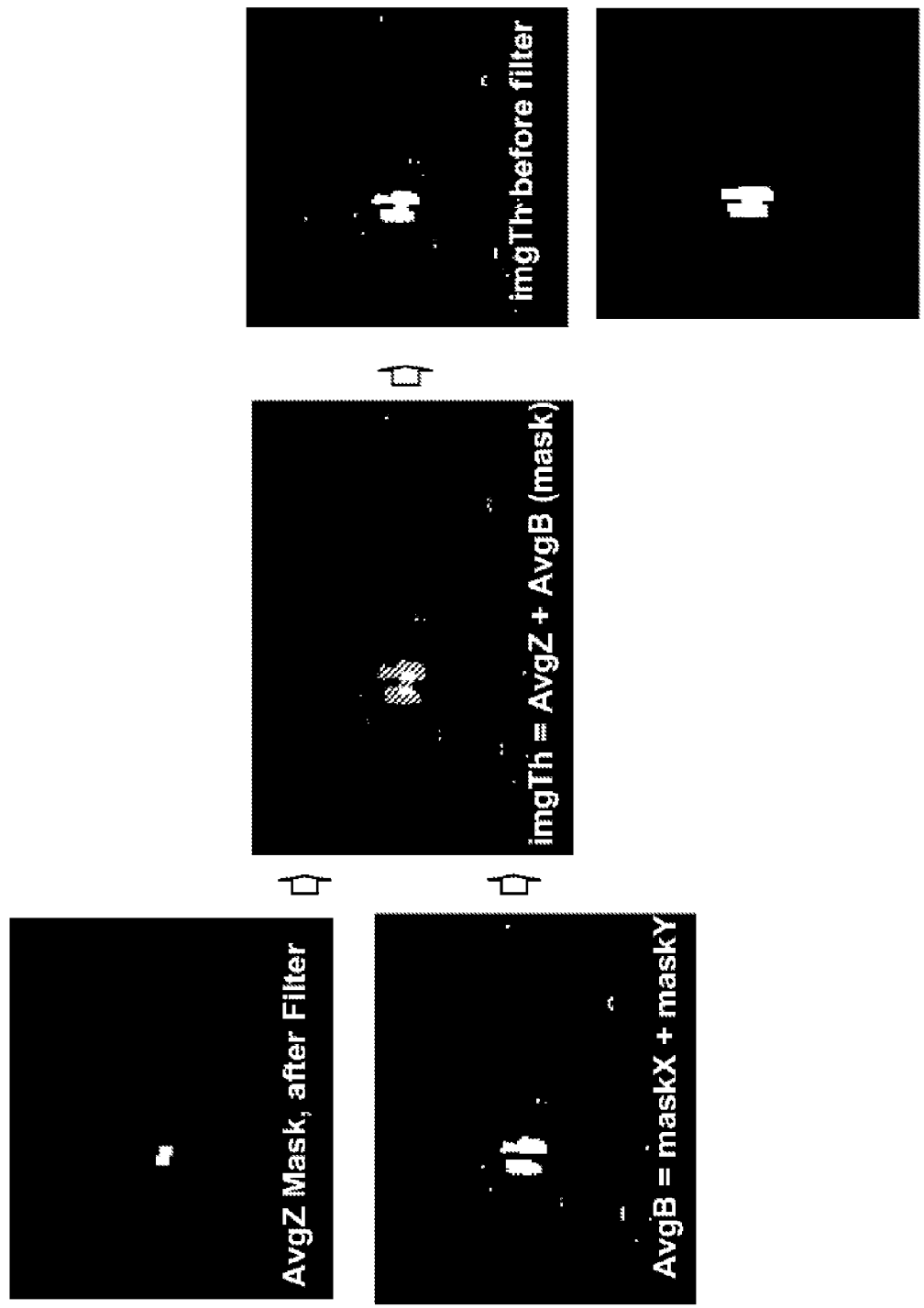

At step 418, a threshold is also applied to the above determined image differences AvgX and AvgY to produce respective masks MaskX and MaskY, which are in turn added to each other to produce image AvgB. That is, MaskX and MaskY are combined to form the composite mask image AvgB, as shown in FIG. 6C. Subsequently at step 420, the filtered AvgZMask is combined with the composite mask image AvgB to produce a final mask, denoted as ImgTh, which indicates the region or regions to be replaced. These final masks determine substantially precise cut out regions in the images for each of the moving objects detected. The AvgZMask image may also be filtered to remove undesirable or unwanted noise, as shown in FIG. 6D.

At step 422, an image offset, denoted as ImgOffSet, is produced by overlaying the reference averaged sequence Avg0 over the final mask ImgTh. Further, the region or regions determined above to be replaced are removed or cut out from the reference averaged sequence Avg0 to produce ImgAvg or Img0, at step 424.

Finally at step 426, the image offset ImgOffSet is combined with ImgAvg to derive a final image ImgFinal, in which the determined final mask ImgTh is inserted in the evaluated masked region, as shown in FIG. 6E. As such, this masking process enables extracting averaged moving regions and replacing them with the mask of corresponding true temporal regions. Steps 416 through 426 correspond to the processing unit 308.

As the scintillation removal process involves a circular buffer of input image frames, another final image ImgFinal is similarly produced using an updated frame sequence set 1. This updated frame sequence 1 is updated to become frame sequence 2 by adding the newest image frame 103n+1 received from the image input unit 302 or uploaded from the data storage memory 206 or the CPU memory 216, and dropping the oldest image frame 103a. As such, the frame sequence set 2 comprises n successive frames 103a+1-103n+1 that are processed to produce the another final image ImgFinal.

As each of the produced final images ImgFinal may include parts that are undesirably light or dark, a LAP process may be utilized to develop desirable contrast and brightness of the pixels of these problematic parts, at step 428. The LAP unit 309 serves to improve image interpretability so as to allow an observer to see objects in the images that may otherwise be difficult or near impossible to assess in the original high-contrasted and high-brightened images. Once balanced and sharpened by the LAP unit 309, the final images ImgFinal are output by the image output unit 310, at step 430.

Figure 7:
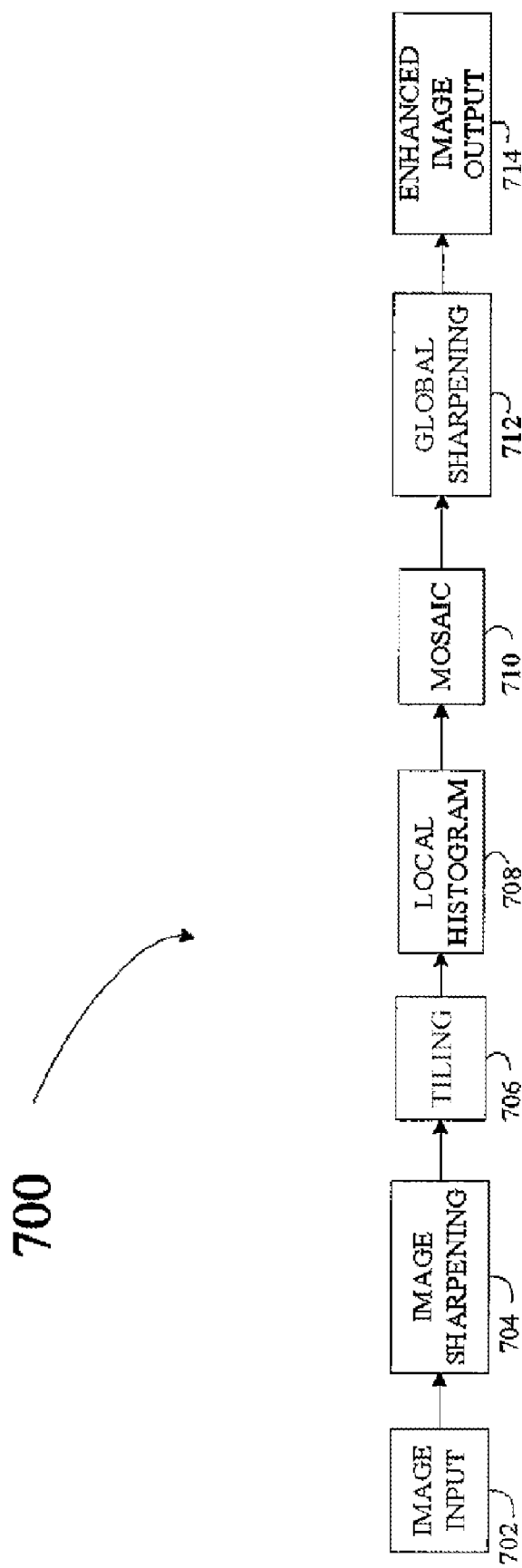
FIG. 7 is a flow diagram illustrating an exemplary embodiment of a local area process (LAP) performed by the image acquisition and processing unit of FIG. 2 in accordance with the present invention.

One exemplary embodiment of the LAP unit 420 is functionally represented by an algorithmic flow diagram illustrated in FIG. 7. Each of the final images ImgFinal is initially processed in a sharpening routine 704 which sharpens images, such as the multi-resolution un-sharp process discussed above. Next, a tiling routine 706 which involves breaking or dividing the final images ImgFinal into tiles, having about 20 to 80 pixels to a side. This tiling of images enables each tile to be processed or treated independently by predetermined subsequent processing units, such as the local histogram unit 708.

The local histogram process 708 enables an efficient redistribution of dynamic range of each of the tiles composing the final image ImgFinal, which can achieve a maximum dynamic range for each tile. Next, a mosaic routine 710 is used to reassemble or bring together all tiles the final image ImgFinal in the same arrangement they had prior to the tiling routine 706.

Finally, a global sharpening is performed on the whole regrouped final image ImgFinal by the global image process 712 so as to achieve optimum image acuity. The global sharpening process 712 emphasizes edges and other high frequency components of the final image ImgFinal, as well as differences between adjacent light and dark areas or spots. Typically, sharpening processes involve employing filters to decompose images into many frequency bands, attenuating low frequency bands, amplifying high frequency bands, and recombining modified spatial frequency bands.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method for reducing scintillation in an image of a scene, the method comprising:
   receiving an input sequence of images of the scene;
   grouping a first number of images that occur in sequence within the input sequence of images of the scene into a first subset of images;
   grouping a second number of images that occur in sequence within the input sequence of images of the scene into a second subset of images;
   generating a first combined image by applying an arithmetic algorithm to the first subset of images;
   generating a second combined image by applying the arithmetic algorithm to the second subset of images;
   creating a composite mask based on at least the first combined image and the second combined image;
   generating a composite image using the composite mask and at least one of the first combined image or the second combined image; and
   outputting the composite image.

2. The method of claim 1 wherein the arithmetic algorithm comprises an averaging algorithm.

3. The method of claim 1 comprising:
   grouping a third number of images that occur in sequence within the input sequence of images of the scene into a third subset of images; and
   generating a third combined image by applying the arithmetic algorithm to the third subset of images;
   wherein creating a composite mask is based on at least the first combined image, the second combined image, and the third combined image, and generating a composite image uses the composite mask and at least one of the first combined image, the second combined image, or the third combined image.

4. The method of claim 3 wherein creating a composite mask comprises:
   generating a first difference image by subtracting the second combined image from the first combined image;
   generating a second difference image by subtracting the third combined image from the first combined image; and
   creating the composite mask based on at least the first difference image and the second difference image.

5. The method of claim 4 wherein creating a composite mask comprises:
   generating a combined difference image by summing at least the first difference image and the second difference image;
   creating a first mask by applying a first threshold value to the combined difference image;
   creating a second mask by apply a second threshold value to the first difference image;
   creating a third mask by apply a third threshold value to the second difference image; and
   summing at least the first mask, the second mask, and the third mask to produce the composite mask.

6. The method of claim 5 wherein the first threshold value is different from the second threshold value and the third threshold value.

7. The method of claim 3 wherein generating a composite image comprises:
   creating an image offset by overlaying one of at least the first combined image, the second combined image, or the third combined image over the composite mask;
   generating an intermediate image by removing at least one region determined by the composite mask from the first combined image; and
   combining the image offset with the intermediate image to produce the composite image.

8. The method of claim 3 wherein the first subset of images includes the second subset of images and the third subset of images.

9. A non-transitory computer-readable storage medium comprising a plurality of computer-readable instructions tangibly embodied therein, the plurality of computer-readable instructions comprising:
   instructions that cause the processor to receive an input sequence of images of the scene;
   instructions that cause the processor to group a first number of images that occur in sequence within the input sequence of images of the scene into a first subset of images;
   instructions that cause the processor to group a second number of images that occur in sequence within the input sequence of images of the scene into a second subset of images;
   instructions that cause the processor to generate a first combined image by applying an arithmetic algorithm to the first subset of images;
   instructions that cause the processor to generate a second combined image by applying the arithmetic algorithm to the second subset of images;
   instructions that cause the processor to create a composite mask based on at least the first combined image and the second combined image;
   instructions that cause the processor to generate a composite image using the composite mask and one of at least the first combined image or the second combined image; and
   instructions that cause the processor to output the composite image.

10. The non-transitory computer-readable storage medium of claim 9 wherein the arithmetic algorithm comprises an averaging algorithm.

11. The non-transitory computer-readable storage medium of claim 9 wherein the plurality of computer-readable instructions comprises:
  instructions that cause the processor to group a third number of images that occur in sequence within the input sequence of images of the scene into a third subset of images; and
  instructions that cause the processor to generate a third combined image by applying the arithmetic algorithm to the third subset of images;
  wherein creating a composite mask is based on at least the first combined image, the second combined image, and the third combined image, and generating a composite image uses the composite mask and at least one of the first combined image, the second combined image, or the third combined image.

12. The non-transitory computer-readable storage medium of claim 11 wherein the instructions that cause the processor to generate a composite mask comprises:
  instructions that cause the processor to generate a first difference image by subtracting the second combined image from the first combined image;
  instructions that cause the processor to generate a second difference image by subtracting the third combined image from the first combined image; and
  instructions that cause the processor to create the composite mask based on at least the first difference image and the second difference image.

13. The non-transitory computer-readable storage medium of claim 12 the instructions that cause the processor to generate a composite mask comprises:
  instructions that cause the processor to generate a combined difference image by summing at least the first difference image and the second difference image;
  instructions that cause the processor to create a first mask by applying a first threshold value to the combined difference image;
  instructions that cause the processor to create a second mask by apply a second threshold value to the first difference image;
  instructions that cause the processor to create a third mask by apply a third threshold value to the second difference image; and
  instructions that cause the processor to sum at least the first mask, the second mask, and the third mask to produce the composite mask.

14. The non-transitory computer-readable storage medium of claim 11 wherein instructions that cause the processor to generate a composite image comprises:
  instructions that cause the processor to create an image offset by overlaying one of at least the first combined image, the second combined image, or the third combined image over the composite mask;
  instructions that cause the processor to generate an intermediate image by removing at least one region determined by the composite mask from the first combined image; and
  instructions that cause the processor to combine the image offset with the intermediate image to produce the composite image.

15. The non-transitory computer-readable storage medium of claim 11 wherein the first subset of images includes the second subset of images and the third subset of images.

16. The non-transitory computer-readable storage medium of claim 11 wherein the second subset of images and the third subset of images have one or more overlapping images.

17. An imaging system, comprising:
  a memory; and
  an image processing unit coupled to the memory;
  wherein the processing unit is configured to execute a method for reducing scintillation in an image of a scene, the method comprising:
    receiving an input sequence of images of the scene;
    grouping a first number of images that occur in sequence within the input sequence of images of the scene into a first subset of images;
    grouping a second number of images that occur in sequence within the input sequence of images of the scene into a second subset of images;
    generating a first combined image by applying an arithmetic algorithm to the first subset of images;
    generating a second combined image by applying the arithmetic algorithm to the second subset of images;
    creating a composite mask based on at least the first combined image and the second combined image;
    generating a composite image using the composite mask and one of at least the first combined image or the second combined image; and
    outputting the composite image.

18. The system of claim 17 wherein the arithmetic algorithm comprises an averaging algorithm.

19. The system of claim 17 wherein the method comprises:
  grouping a third number of images that occur in sequence within the input sequence of images of the scene into a third subset of images; and
  generating a third combined image by applying the arithmetic algorithm to the third subset of images;
  wherein creating a composite mask is based on at least the first combined image, the second combined image, and the third combined image, and generating a composite image uses the composite mask and at least one of the first combined image, the second combined image, or the third combined image.

20. The system of claim 19 wherein creating a composite mask comprises:
  generating a first difference image by subtracting the second combined image from the first combined image;
  generating a second difference image by subtracting the third combined image from the first combined image; and
  creating the composite mask based on at least the first difference image and the second difference image.

21. The system of claim 20 creating a composite mask comprises:
  generating a combined difference image by summing at least the first difference image and the second difference image;
  creating a first mask by applying a first threshold value to the combined difference image;
  creating a second mask by apply a second threshold value to the first difference image;
  creating a third mask by apply a third threshold value to the second difference image; and
  summing at least the first mask, the second mask, and the third mask to produce the composite mask.

22. The system of claim 19 wherein generating a composite image comprises:
  creating an image offset by overlaying one of at least the first combined image, the second combined image, or the third combined image over the composite mask;
  generating an intermediate image by removing at least one region determined by the composite mask from the first combined image; and combining the image offset with the intermediate image to produce the composite image.

23. The system of claim 19 wherein the first subset of images includes the second subset of images and the third subset of images.

\* \* \* \* \*